United States Patent Office

3,235,391
Patented Feb. 15, 1966

3,235,391
PROCESS FOR MAKING INSTANT
FRUIT PRODUCT
William R. Dorsey, Orinda, Calif., assignor to Vacu-Dry
Company, Oakland, Calif., a corporation of California
No Drawing. Filed Mar. 31, 1961, Ser. No. 99,703
6 Claims. (Cl. 99—204)

This application is a continuation-in-part of pending application Serial No. 741,238, filed June 11, 1958, by William R. Dorsey for Process of Dehydration, now abandoned.

This invention relates generally to instant fruit products and more particularly to an improved dehydrated fruit sauce, which is instantly reconstitutable for immediate use, and to a process for making the product.

One object of the present invention is to provide an improved fruit product which is capable of being instantly rehydrated for immediate use without further cooking.

Another object of this invention is to provide an improved process for dehydrating fruits utilizing a precooking step to produce an instant fruit sauce product.

Still another object of this invention is to provide an improved process for dehydrating fruit utilizing a flaking step to produce an improved fruit sauce product which retains a natural fruit flavor and still is smooth and without a grainy or gritty texture.

A further object of the present invention is to provide an instant apple sauce and an improved process for making instant apple sauce. The foregoing and other objects and advantages of this invention will become apparent from a consideration of the following description which describes a selected embodiment of the present invention in the form of an improved apple product produced by the best mode contemplated for carrying out the improved process.

Prior to the development of the present invention it has been common to dehydrate apples and to comminute them into a powder form so that the reconstituted product would be an applesauce. In such a product it has been necessary to cook the rehydrated material in order to produce an applesauce ready for human consumption. Thus, the prior art products have not been "instant" sauces ready for consumption upon the mere addition of water. Furthermore, prior art fruit sauces have not retained the natural fruit flavor and customarily had a grainy or gritty texture.

In producing the apple product selected as being illustrative of this invention, mature fresh apples are first peeled and cored. The apple flesh is then sliced to a convenient size, for example, approximately ¼ to ⅜ inch in thickness.

The sliced apples then are subjected to a sulphite treatment, as will be familiar to those skilled in this art, for the purpose of preventing oxidation of the newly exposed surfaces.

Following the foregoing preparation, all of which is well-known in the art, the sliced apples are precooked for about three to seven minutes at a temperature of approximately 212° F. In the preferred embodiment this precooking step is performed in a conventional steam cooker. For soft mature apples a time of 3¾ minutes produces a satisfactory final product, whereas for harder apples a precooking period for as long as seven minutes has been found to be necessary to produce a satisfactory product. It is preferable to determine the degree of precooking accurately by penetration testing apple samples as is more fully described in U.S. Letters Patent No. 3,060,037 for Process of Dehydration, issued October 23, 1962, to William R. Dorsey et al.

After the apple slices have been treated as aforesaid they are air-dried to a moisture content in the range of 18% to 24% by weight.

Seasoning is then added, if desired. For the apple product illustrated here, sugar is added in the approximate weight ratio of 25% sugar to the sliced apples on a dry weight basis. The sliced apples and sugar are thoroughly mixed.

To produce one form of instant sauce, as has been described in application Serial No. 741,238, now abandoned, the apple-sugar mixture is ground using a grinder plate having ¼ inch openings.

The ground apple product is then further dried by air-drying or vacuum drying to a moisture content of below 3½%, preferably as low as 2½%. It is essential that the moisture content of the product be reduced below 3½% to prevent discoloration during storage. In addition, the described low moisture content prevents caking of the product. If the moisture is in excess of 3½%, the dehydrated fruit particles clump and adhere together, requiring the addition of an unpalatable quantity of one or more anti-caking additives.

The dehydrated product then is milled so that it will pass through a screen in the range between U.S. 10 and U.S. 20 mesh, inclusive. A moisture content of the dehydrated product below 3½% is critical for efficient grinding. If the moisture is in excess of 3½, the operation becomes gummy and inefficient.

At this point the product may be packaged for commerical use.

The foregoing several steps have been described in pending application Serial No. 741,238. It has been found that further improvement in an instant fruit sauce can be obtained by the additional process steps hereinafter described.

Instead of grinding the seasoned slices prior to dehydration, the unseasoned fruit slices air-dried to 18% to 24% moisture are first diced to ⅛ to ⅜ inch cubes. The fruit cubes then are dehydrated by air-drying or vacuum-drying to a final moisture content of below 3½% as described above.

After the diced fruit has been dried to a low moisture content, it is warmed until the cubes become pliable. This warming step has been performed satisfactorily on apples with radiant-type heating equipment and is important to render the fruit cubes pliable prior to the subsequent rolling step. Otherwise the cubes shatter and disintegrate when rolled.

After the diced fruit, for example the foregoing diced apples, has been warmed it is passed between rollers to produce an intermediate flaked product having a finished flake thickness within the range of 0.010 inch to 0.040 inch.

This flaking step breaks down the fiber in the fruit without destroying the cellular structure, thereby eliminating the grainy or gritty texture of prior art sauce products. This step is very important to obtain a smooth product which retains a true fruit flavor. The flake thickness is critical. If the finished flake thickness for apples is under 0.010 inch, the product becomes cottony, loses some of its apple flavor and tends to ball up on one's tongue when eaten. If the finished flake is over 0.040 inch in thickness, apple pieces are the result and not a sauce.

The flaked fruit flesh then is milled to granular size so that the granular particles pass through a U.S. 10–20 mesh screen. This form of instant sauce produce also may then be seasoned and packaged for commercial use.

Both of the described apple products form an instant applesauce by the addition of approximately 8 counces of cold water to from 1 to 1½ ounces of dehydrated product. The mixture is stirred slightly until dispersed. It then is permitted to stand for three to five minutes, whereupon it is ready to be served and eaten without additional cooking.

Modifications of the disclosed product and process may become apparent without departing from the scope of this invention. For instance, as an alternative to the procedures disclosed above, citric acid, vitamin C or other seasoning may be added either immediately prior to the grinding or cubing operation or sugar and other seasoning may be added following the final milling. A ¼ of 1% calcium stearate also may be added following the final milling in order to deter caking of the final product.

It will be apparent that the described process is applicable to fruits other than apples without departing from the scope of this invention. For some fruits only a single dehydration step is required after precooking, rather than the two step dehydration described and generally applied to apples. Some of the advantages of the foregoing procedures may be obtained by dehydrating the fruit slices after precooking but without the subsequent grinding, milling or flaking operations to produce an instant sliced fruit product.

The foregoing detailed description, therefore, has been given for clearness of understanding only and no unnecessary limitation should be understood therefrom for modifications will be obvious to those skilled in the art.

I claim:

1. In a process for making dehydrated fruit which is instantly reconstitutable into a cooked sauce by the mere addition of cold water wherein the fruit is dehydrated to a moisture content less than 3½% by weight, the improvement comprising precooking said fruit prior to dehydration and terminating said precooking prior to breakdown of the natural cell structure and piece identity of said fruit; comminuting said fruit prior to complete dehydration; and then after dehydration warming the comminuted fruit particles until they become pliable; rolling the warmed fruit particles into flakes having a compressed and unbroken cellular structure; and then milling said flakes.

2. A process according to claim 1 wherein said fruit particles are rolled into flakes having a thickness in excess of 0.01 inch.

3. In a process for making dehydrated fruit which is instantly reconstitutable into a cooked sauce by the mere addition of cold water wherein the fruit is dehydrated to a moisture content less than 3½% by weight, the improvement comprising precooking said fruit prior to dehydration for about 3 to 7 minutes at a temperature of about 212° F. at atmospheric pressure; comminuting said fruit prior to complete dehydration; and then after dehydration warming the comminuted fruit particles until they become pliable; rolling the warmed fruit particles into flakes having a compressed and unbroken cellular structure; and then milling said flakes.

4. A process according to claim 3 wherein said fruit is apple and the particles are rolled into flakes having a thickness in excess of 0.01 inch.

5. In a process for making dehydrated fruit which is instantly reconstitutable into a cooked sauce by the mere addition of cold water wherein the fruit is dehydrated to a moisture content less than 3½% by weight, the improvement comprising precooking said fruit prior to dehydration for about 3 to 7 minutes at a temperature of about 212° F. at atmospheric pressure; comminuting said fruit prior to complete dehydration into ⅛ to ⅜ inch particles; and then after dehydration warming the comminuted fruit particles until they become pliable; rolling the warmed fruit particles into flakes having a compressed and unbroken cellular structure; and then milling said flakes.

6. A process according to claim 5 wherein said fruit is apple and the particles are rolled into flakes having a thickness within the range of 0.01 to 0.04 inch.

References Cited by the Examiner

UNITED STATES PATENTS

| | | | |
|---|---|---|---|
| 109,068 | 11/1870 | Smith | 99—204 |
| 1,259,633 | 3/1918 | King | 99—204 |
| 2,155,453 | 4/1939 | Stuntz | 99—204 |
| 2,192,041 | 2/1940 | Headland | 99—204 |
| 2,451,312 | 10/1948 | Arengo-Jones | 99—204 |
| 2,474,650 | 6/1949 | Birdseye | 99—204 |
| 2,901,359 | 8/1959 | Forkner | 99—204 |

A. LOUIS MONACELL, *Primary Examiner.*

ABRAHAM H. WINKELSTEIN, HYMAN LORD,
*Examiners.*